(12) United States Patent
Reist

(10) Patent No.: US 6,450,319 B1
(45) Date of Patent: Sep. 17, 2002

(54) PROCESSING SYSTEM FOR PROCESSING PIECE GOODS

(75) Inventor: Walter Reist, Hinwil (CH)

(73) Assignee: Ferag AG, Hinwil (CH)

( * ) Notice: Subject to any disclaimer, the term of this patent is extended or adjusted under 35 U.S.C. 154(b) by 0 days.

(21) Appl. No.: 09/673,690

(22) PCT Filed: Apr. 15, 1999

(86) PCT No.: PCT/CH99/00151

§ 371 (c)(1),
(2), (4) Date: Nov. 20, 2000

(87) PCT Pub. No.: WO99/54244

PCT Pub. Date: Oct. 28, 1999

(30) Foreign Application Priority Data

Apr. 20, 1998 (CH) .............................................. 893/98

(51) Int. Cl.[7] .............................................. B65G 37/00

(52) U.S. Cl. ...................................... 198/358; 104/103

(58) Field of Search ........................ 198/358; 104/103; 414/134

(56) References Cited

U.S. PATENT DOCUMENTS

| | | | | |
|---|---|---|---|---|
| 4,203,369 A | * | 5/1980 | Perrott ........................ | 104/103 |
| 4,244,672 A | * | 1/1981 | Lund ........................ | 198/349.7 |
| 4,944,227 A | * | 7/1990 | Madsen ........................ | 104/103 |
| 5,934,444 A | * | 8/1999 | Kierpaul et al. .......... | 198/465.1 |
| 6,332,406 B1 | * | 12/2001 | Mugnier ................ | 104/130.01 |

OTHER PUBLICATIONS

WO 98/03422, Publication Date: Jan. 29, 1998, Process and Apparatus for Conveying Pressroom Products.
WO 98/03420, Pubication Date: Jan. 29, 1998, Conveyor.

* cited by examiner

Primary Examiner—Christopher P. Ellis
Assistant Examiner—Richard Ridley
(74) Attorney, Agent, or Firm—Rankin, Hill, Porter & Clark LLP

(57) ABSTRACT

The processing system serves for processing piece goods (e.g. containers or printed products). It comprises a conveying system with a closed rail track system optionally having switch points (SV, SZ) and a plurality of conveying/holding means displaceable in one direction on the track system independently of one another and it further comprises devices (A) for loading conveying/holding means with items or groups of items to be processed, devices (V) for processing items or groups of items and devices (B) for unloading items or groups of items from conveying/holding means. An entry control means and upstream thereof a collecting section are allocated to each device (A, B, V). The entry control establishes the spatial orientation and the temporal sequence of the conveying/holding means or of the items as required by the device. If necessary, the conveying/holding means are retained along the collecting section before the entry monitoring. The devices (A, B, V) with entry control means allocated thereto and switch points (SV, SZ) are organized separately or in groups in autonomous stations (S) with station-internal control means, which control, independently of other stations (S), at least the function of the devices (A, B, V) and their entry control and/or the function of the switch points (SV, SZ) as well as conveyance of the conveying/holding means through the station. The processing system can additionally comprise a central control unit which determines guidelines for momentary throughputs for autonomous stations (S) according in particular to registered filling states of the collecting sections.

19 Claims, 5 Drawing Sheets

PROCESSING SYSTEM FOR PROCESSING PIECE GOODS

BACKGROUND OF THE INVENTION

The invention relates to a processing system for processing substantially identical or at least partly similar items that are to be processed in large numbers and in an ordered sequence either individually or in defined groups and usually in a more or less precisely defined position and spatial orientation. In this kind of process each item or each group of items is processed in a plurality of successive processing steps and is usually conveyed from one processing device to the next via a conveying line.

A conveying device applicable in such processing systems is disclosed, for example, in the publication WO-98/03420.

Piece goods such as bottles or other containers are processed in the following steps: cleaning, drying, testing, filling, sealing and labeling. Printed products are processed in the following steps: completing, trimming, binding or stitching, sorting, addressing, grouping, and packing. The items (e.g. containers or printed products) are mostly processed in a serial sequence of successive process steps while being held in a specific processing position and orientation defined by the processing device. The items are conveyed to and from processing devices, whereby a defined conveying position may also be necessary (e.g. conveyance of filled, but not yet closed containers).

According to the state of the art, such piece good processing is carried out according to substantially two methods, mixed forms with areas of the one as well as the other method are being also used.

One of the named methods is the "device orientated method" in which the individual processing devices and the intermediate individual conveying devices are largely independent of each other. For each processing device and for each conveying line, the items are picked up by corresponding holding means and after processing or conveyance are unloaded again. Buffers are provided to compensate for differing capacities and output fluctuations of individual processing devices. The buffers, for example, may be conveying lines without a strictly defined conveying order that allow retaining (e.g. conveying belts on which standing bottles can be retained). The buffers may also be provided as waiting positions in which the items wait for further processing in a more or less unordered manner.

An important advantage to such device orientated processing methods is the functional modularity which allows modularity regarding devices possible and which renders bifurcations and junctions in the conveying line simple and substantially free of problems. An important disadvantage of the methods is the necessary and possibly very frequent handing-over of items from a conveying or holding means to a further holding or conveying means. Such handing-over causes high strain, especially on sensitive items. This is also the case for buffer storages and waiting positions in which the items are retained and are moved in a more or less unordered manner, whereby they are often subject to friction against each other or against conveying means and thus are unnecessarily strained.

The other named method is the "system-orientated method" in which processing devices and conveying devices are combined in a fixed manner forming a system. In such a system the conveying steps and processing steps are functionally coupled and the conveying devices and processing devices are mechanically coupled, by common centrally controlled conveying means on all conveying lines of the system. The conveying means are, at the same time, at the holding means for processing in at least part of the processing devices. These conveying/holding means are arranged on a central hauling means (e.g. endless traction chain) by which the conveying/holding means are transported in a forced manner along a plurality of conveying lines and through a plurality of processing steps.

In a processing system that works according to the system-orientated method, all components are subordinated to restricting system conditions. For all participating processing devices the processing cycle is identical and fixedly predetermined or it is variable for all devices at the same time. The processing orientation for the items in different processing devices can differ from each other only within very restricted limits. The main advantage of the system-orientated method is the fact that the items don't need to be handed over and, therefore, a lot of expenditure for devices is saved. The main disadvantages are the strict conditions regarding the processing cycle and the processing orientation restricting the processing devices such that, in many cases, they cannot work optimally and cannot be chosen freely. A further disadvantage of the system-orientated method is the fact that conveying bifurcations within the system can only be realized by removing items from the conveying means, creating voids in the conveying stream and reducing throughput further downstream. If the system-orientated method is to be combined with continuous conveyance, conveying and processing must be synchronized very precisely which involves a large effort, particularly for larger systems.

In order to reduce the named disadvantages of the device- and system-orientated methods it is common, as stated above, to use mixed systems with regions of the one method and adjacent regions of the other method. Thereby, the choice of method in each region is, in particular, defined by the kind of processing device to be used.

SUMMARY OF THE INVENTION

It is an object of the invention to create a system for piece good processing that is in its nature system-orientated but allows integration of processing devices posing the most various conditions. Thus the inventive processing system is to unite the advantages of the above described device-orientated and system-orientated method for piece good processing while at the same time avoiding at least a part of their disadvantages. The inventive processing system allows full automation but, at the same time, allows manual process steps also. Furthermore, the inventive processing system is easily adaptable to the most various items to be processed, in particular to items of which not all are to be processed in the same processing steps, i.e. are not to run through the system on the same conveying paths. The inventive processing system is also adaptable to the most various spatial conditions and is easily extendable.

Items to be processed are supplied into the inventive processing system and processed items are conveyed away from the system. Furthermore, auxiliary materials may be supplied to individual processing devices of the system and/or conveyed away from such devices. The system is functionally closed in itself and consists of a plurality of functional units that are at least partly represented by mechanical units. The mechanical components of the processing system according to the present invention include:

a conveying system comprising a rail system and a plurality of conveying/holding means that are independent of each other and serve for the held conveyance of items or groups of items and are displaceable along the rails of the rail system;

least one loading device and at least one unloading device serving for loading conveying/holding means with items or groups of items and for unloading items or groups of items from conveying /holding means;

at least one processing device serving for processing (in the broadest sense of the word) items or groups of items.

The rail system is substantially closed in itself and the independent conveying/holding means are displaceable on the rails in a predetermined direction by a plurality of corresponding drives. The rail system may comprise bifurcations and junctions (switch-points). Rail system and conveying/holding means are matched to each other such that the orientation of the items relative to the rails are within wide limits freely selectable and locally variable. This means that the conveying system of the inventive processing system defines conveying lines which can comprise, freely selectable within the broadest limits, rising and falling regions as well as curves and on which different relative orientations are made possible wound rail sections and/or by variable connections between conveying and holding means.

The rail system connects loading devices with processing devices, processing devices with subsequent processing devices, processing devices with unloading devices and unloading devices with loading devices, whereby the rails extend through the devices or bypass them. The conveying/holding means are conveyed along the conveying lines between loading, unloading or processing devices and through devices, either driven by drives or passively, i.e. without mechanical drive, e.g. with the aid of gravity on falling conveying lines or with the aid of previously collected kinetic energy on so called run-out lines.

The conveying/holding means form compressible conveying streams as long as they are distanced from each other along the rails and they are individually driven in such compressible conveying streams. Conveying streams in which the conveying/holding means follow each other along the rails without being distanced from each other are not compressible and can be conveyed by driving only the rearmost conveying/holding means in a pushing manner.

Upstream of loading, unloading and processing devices, entry control means are provided. The entry control means serve for bringing supplied conveying/holding means or items or groups of items held by conveying/holding means, respectively, into a spatial orientation and for establishing a temporal sequence of items whereby the orientation and temporal sequence correspond to the conditions of the loading, unloading and processing devices. Upstream of the entry control means, the supplying conveying lines are designed as collecting sections, i.e. as a line section along which conveying/holding means (empty or loaded), in which items that cannot be processed immediately are retained in an orderly manner.

The conveying drives are advantageously arranged along the rails and interact with the conveying/holding means by an effective connection. Between driven conveying line sections (those having active conveyance), there may be sections with passive conveyance. The conveyance through loading, unloading or processing devices is matched to the function of the device. Drives serving for conveyance only advantageously have a substantially constant or unchanged speed whereby fluctuations in the throughput lead to fluctuations in the distances between the conveying/holding means. In other words, it is more advantageous to compress the conveying streams than to increase the conveying speed for increasing the throughput. The collecting sections are advantageously designed as lines with passive conveyance.

The system comprises, as functional units, a plurality of stations that are largely independent (autonomous) regarding control, i.e. in particular independent of each other. These stations are processing, loading and unloading stations each comprising a processing, loading or unloading device with an entry control means allocated to the device and a conveying drive which possibly drives the entry control means also or even representing it. Autonomous stations may also comprise a plurality of identical or different devices arranged in parallel or in series and comprising corresponding entry control means and conveying drives. In addition to the named devices, autonomous stations can also comprise rail bifurcations and/or rail junctions. Alternatively, rail bifurcations or rail junctions may represent autonomous stations themselves, with or without entry control. Finally, the system may comprise autonomous stations serving for conveyance only and comprising a rail track and at least one suitable drive.

The autonomous stations of the inventive processing system comprise control means with station-internal actors which, in constant or clocked manner or due to momentary conditions (sensed by sensor means) in the station or in the immediate surroundings of the station, act directly or indirectly on the conveying/holding means (e.g. conveying, accelerating, decelerating, establishing predetermined orientation) and/or on items (e.g. establishing orientation, processing). The control means of the autonomous stations control, in particular, the entry control means, conveyance through the station, temporal sequence of functions of station devices (cycle regime) and possibly processing modes to be carried by station devices (processing regime).

For controlling and mutual matching the throughput of the autonomous stations or the station devices, respectively, it is advantageous to provide central management means. The function of such central management comprises, in particular, the adaptation of the throughput of the individual stations to conditions from outside of the system or to system-inherent conditions (in particular to the filling state of collecting sections) and possibly the optimization of system operation by coordinating the throughput of the stations. The central management may, furthermore, take over configuration tasks and central security functions. The central management may comprise own sensors and/or actors or use those of the autonomous stations. The central management is advantageously automated but can, however, be operated manually.

Due to the high flexibility of the conveying system, the high autonomy of the system stations (which substantially means a high autonomy of individual devices or device groups), and the clear division of tasks between station-internal and central management, the inventive system has a very high integration ability for devices with the most various demands and a modularity that is easily adaptable to external conditions and easily extendable. All the same, each item is conveyed through the system by substantially the same conveying/holding means and handing-over steps are not needed. This protects the items and simplifies processing and conveying. These advantageous characteristics are supported by corresponding characteristics of the system components, in particular of the conveying system.

BRIEF DESCRIPTION OF THE DRAWINGS

These and further features of the inventive processing system will be apparent with reference to the following description and drawings, wherein.

DETAILED DESCRIPTION OF THE PREFERRED EMBODIMENTS

Figure 1:
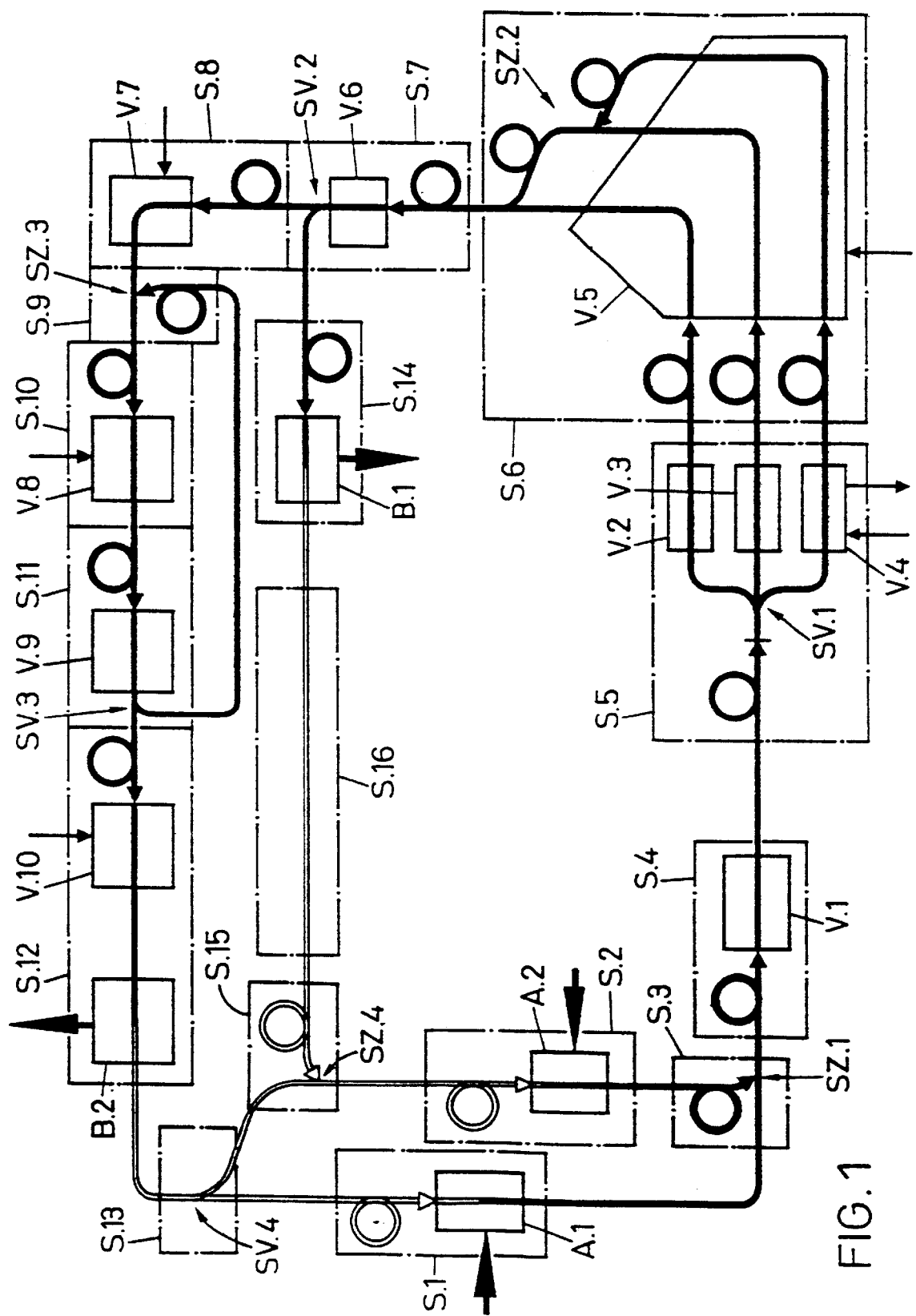
FIG. 1 shows a diagram of an example of the inventive processing system.

FIG. 1 shows a diagram of an example of the inventive processing systems. In this diagram the rail system is shown in bold lines in sections in which loaded conveying/holding means are conveyed. The rail system is shown in double lines in sections in which empty conveying/holding means are conveyed. For purposes of clarity, the conveying/holding means and the items are not shown. Devices for loading (A), unloading (B) or processing (V) items are shown as unbroken boxes, while autonomous stations (S) are shown as broken boxes. Entry control means, with preceding collecting sections, are shown as loops integrated in conveying lines with arrows pointing in conveying direction. Supplying items to, and conveying them away from, the system is shown by means of bold arrows, which are directed towards loading devices A and away from unloading devices B. Supply and removal of auxiliary materials into and from processing devices V are shown with correspondingly directed slim arrows.

The system comprises ten processing devices V.1 to V.10, two loading devices A.1 and A.2, two unloading devices B.1 and B.2, four rail bifurcations SV.1 to SV.4 and four rail junctions SZ.1 to SZ.4 (switch points). These devices (A, B, V) and switch points (SV, SZ) are organized in fifteen autonomous stations S.1 to S.15. A further autonomous station S.16 is a pure conveying station.

The system shown in FIG. 1 serves, for example, for processing bottles or other containers by pre-cleaning (V.1), cleaning (V.2, V.3 and V4), drying (V.5), first monitoring (V.6), filling (V.7), sealing (V.8), second monitoring (V.9) and labeling (V.10). In such an exemplary system, after the first monitoring (V.6) conveying/holding means carrying bottles classified as useless are removed from the system (rail bifurcation SV.2) and, after the second monitoring conveying/holding means carrying bottles with unsatisfactory sealing are returned to the sealing device V.8 (rail bifurcation SV.3 and rail junction SZ.3).

The autonomous stations S.1, S.2, S.4, S.8, S.10 and S.14 each comprise a device, entry control means allocated to the device, at least one conveying drive and a collecting section upstream of the entry control means. Control means for controlling this kind of station serve, in particular, for controlling the entry control means, i.e. for establishing item orientation and sequence suitable for the device, controlling conveyance of the conveying/holding means through the area of the device and, controlling the loading, unloading and processing steps, whereby the three functions (entry control, conveyance and processing) must be matched to each other. The station control is, for example, governed by a station cycle or is activated by a conveying/holding means, by an item, or by a group of items passing the entry control. Furthermore, supply and removal of auxiliary materials (e.g. cleaning media, energy, medium for filling, seals, labels) is governed by the station control.

The autonomous station S.5 comprises three parallel devices V.2 to V.4 (e.g. cleaning devices), a rail bifurcation upstream of the devices and entry control means upstream of the bifurcation, as well as at least one conveying drive. Station control of such a station controls the rail bifurcations SV.1 in addition to the functions described above. The rail bifurcation may be controlled solely by a station clock.

The rail bifurcation SV.1 may also be controlled according to characteristics of the arriving items such that, due to a relevant characteristic, the arriving items are supplied selectively into one of the three devices and are processed accordingly. For sensing such relevant characteristics corresponding sensors are provided or, alternatively, the conveying/holding or the items are equipped with visual or electronic data to be read by corresponding reading devices. In the case of different processing in the processing devices V.2, V.3 and V.4, entry control may be provided for each device downstream of the rail bifurcation.

The autonomous station S.6 comprises a processing device V.5 (e.g. drying oven) that is passed by three parallel rail tracks, the rail tracks being united again in the following rail junction SZ.2. The corresponding entry control establishes, for example, a container orientation such that the opening is facing downwards and a container velocity. The container velocity is preferably set irrespective of possibly irregular container distances such that the length of time the containers stay in the oven is sufficient for adequate drying. The station control substantially is responsible for establishing the container orientation, for keeping constant the oven temperature, oven airing and/or container velocity, and for controlling the rail junction SZ.2.

The two autonomous stations S.7 and S.11 contain monitoring devices V.6 and V.9 with entry control means and bifurcations SV.2 and SV.3 downstream of the monitoring devices. In these stations the items are monitored and classified and conveyed away according to classification. The station control controls the entry control, the conveyance, the succession of controlling actions and the rail bifurcations that are is triggered according to the result of the classification.

The autonomous station S.12 comprises two devices arranged in series (processing device V.10 and unloading device B.2) as well as entry control means upstream of the devices. Such a combination of different devices in one autonomous station is advantageous, if the two devices accept the same conditions regarding the sequence of items or item groups (identical cycle and coupled throughput) or it the device further downstream accepts any conditions. In such a case it is also possible to convey the conveying/holding means through both devices by the same drive.

The autonomous stations S.3, S.9, S.13 and S.15 are autonomous switch points (rail bifurcation SV.4 in S13, rail junctions SZ.1 in S3, SZ.3 in S.9, SZ.4 in S.15). The station control of such autonomous switch points may differ greatly according to specific requirements. Rail bifurcations and rail junctions may be positioned according to a fixed time cycle or by the presence of conveying/holding means, whereby each individual or group of conveying/holding means are supplied to one or the other rail track or are accepted from one or the other rail track. At rail junctions, one rail track may also have priority such that conveying/holding means from a rail track without priority are only transferred onto the rail track with priority in the case of gaps on the rail track with priority. Usually there are collecting sections provided for at least one of the rail tracks (with no priority) joining at a junction.

The collecting sections are advantageously rail tracks along which conveying/holding means are passively conveyed (declining rail sections, run-out lines). On such lines, conveying/holding means may have different speeds and different distances from each other and they can also stand still. The length of each collecting section is to be matched to the throughput fluctuations to be expected at at least the station directly downstream of the collecting section. Advantageously, the collecting sections are rail sections integrated into the rail tracks and they are operated in a first-in-first-out mode. For extension of the collecting sections without enlarging the system loop-shaped rail tracks can be provided. In special cases, collecting section may have the form of cul-de-sac shaped rail sections, such sections being operated in a first-in-last-out mode.

The autonomous stations and the conveying system shown in FIG. 1 are to be understood as an example and thus they do not restrict the inventive system in any manner. Depending on the items to be processed and depending on the processing devices to be used, autonomous stations with different arrangements of devices and different organization as well as differently designed conveying systems can easily be imagined knowing the principle of the inventive system. For each autonomous station it is of central importance that it is independent of other autonomous stations regarding control, whereby the actors controlled by the station control act according to a station clock or according to e.g. events registered by sensors in the station or in the near surroundings of the station. The station control works with known control means and according to known control methods and is designed for each autonomous station according to the function of the station, whereby the function of the device (loading device, unloading device, processing device) and/or of the switch point is central.

Figure 2:
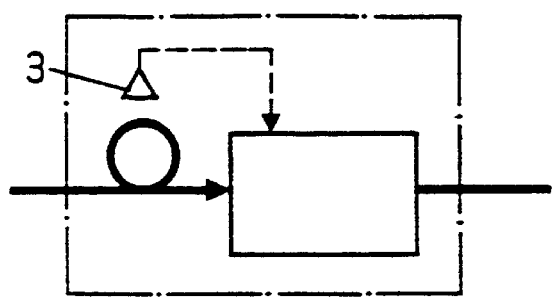
FIGS. 2 to 4 show different throughput control embodiments for the inventive processing system.
Figure 3:
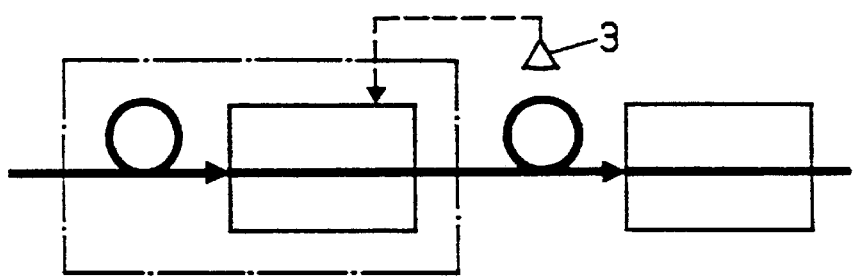
Figure 4:
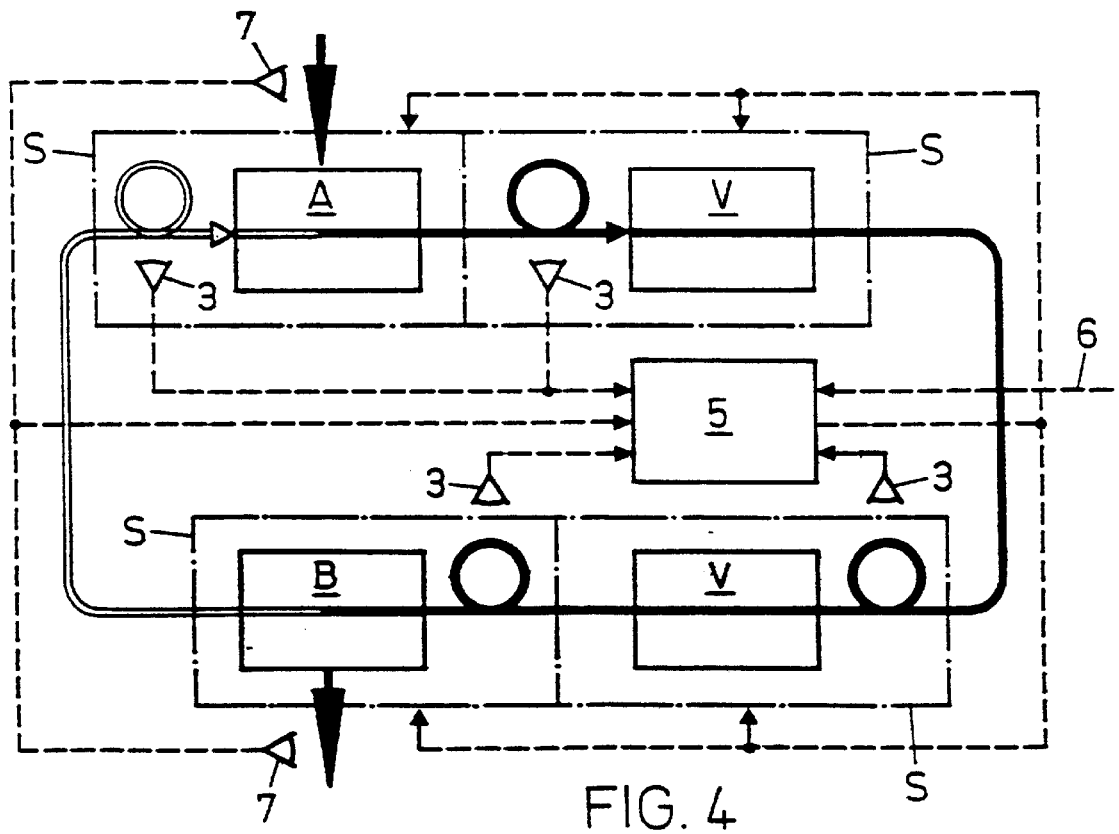

FIGS. 2 to 4 illustrate throughput control using the inventive system. In FIGS. 2 to 4 the same symbols are used as in FIG. 1. In addition, broken lines for data lines and eye-symbols for sensor means are used.

Each device has a controllable throughput (items run through the device per time unit). Simple devices can be switched on and off such that the throughput is varied by periodical switching. In other devices the operational cycle, the processing speed or other parameters influencing the throughput are adjustable. In parallel arrangements of a plurality of identical devices part of the devices can be switched on and off.

The expected mean throughput of the autonomous stations is dependent on their position in the conveying system. In principle, the mean throughput must be equal in each position of the ring that the rail system forms. The mean throughput is to be taken into consideration when installing the system by corresponding choice of the devices. Temporal fluctuations in the throughput of the individual devices are unavoidable (e.g. fluctuations due to the relative share of the bottles to be removed because of corresponding classification) and also occur when devices are defective. These fluctuations are advantageously not only taken up by the collecting sections but also compensated by a throughput control. Using such throughput control it becomes possible to not only maintain operation even with large fluctuations but also to operate more devices with optimal throughputs and interruptions (e.g. repairs on individual devices can be carried out with minimal operational interruption).

FIGS. 2 and 3 show station-internal throughput control. This control relates to the filling state (e.g. registered by sensor means) of the collecting line (sensor 3) upstream of the entry control means (FIG. 2) or of the filling state of the collecting line upstream of the next device further downstream. A low filling state upstream and a high filling state downstream are criteria for a decrease of throughput. A high filling state upstream and low filling state downstream are criteria for a throughput increase. Combinations are also thinkable, i.e. a throughput control according to the filling state upstream and switching off at maximal filling state downstream.

However, for throughput control the inventive system advantageously comprises a central management means, as illustrated in FIG. 4, which shows a very simple inventive system comprising a central control unit 5 and sensor means, e.g. sensors 3, for sensing the filling states of at least part of the collecting sections and sensors 7 for sensing the situation at the supply into the system of items to be processed and the removal of processed items out of the system. Furthermore, the central control means 5 can comprise input means for the input of data (arrow 6).

The central management matches the throughputs of the loading, unloading and processing stations (A, B, V) to each other and according to external conditions (data lines from the central control unit to the autonomous stations) by determining throughput guidelines corresponding to the capabilities of the stations (overriding station-internal throughput control if necessary). The central management may also determine and change priorities, it may optimize station operation (e.g. regarding energy consumption), and operate the system such that at least part of the autonomous stations operate optimally.

The central management advantageously takes over superordinated security functions that act on several or all autonomous stations (e.g. emergency-off). Furthermore, the central control unit may coordinate the operational start and stop and/or take over configuration tasks for process changes or part revisions.

Instead of a central control unit, the central management can also be taken over by a person.

FIGS. 5 to 8 schematically show different embodiments of rail tracks 10 and conveying means 11 equipped with holding means 12 and possible orientation changes for conveying/holding means 11/12 or for items 13 or groups of items being which conveyed by the conveying/holding means. The orientation changes are realized by twisting the rail track and/or by changing (e.g. rotating, pivoting or changing length) the connection between conveying means 11 and holding means 12.

Figure 5:
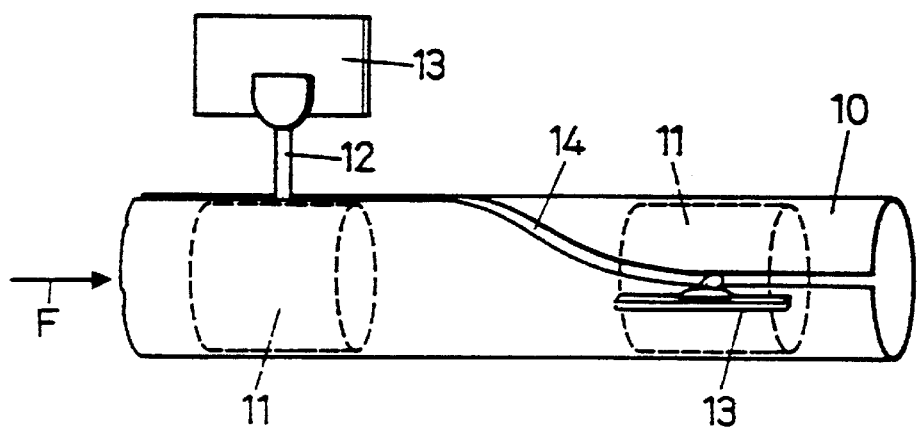
FIGS. 5 to 8 show in a schematic manner different embodiments of rails and conveying/holding means allowing changes of the orientation of conveying/holding means and/or of items in relation to the rail track.

FIG. 5 diagrammatically shows a twisted rail track 10 in form of a guiding channel wherein conveying means 11 are displaced in the conveying direction F. Holding means 12 (e.g. grippers) for holding flat items 13 are arranged on conveying means 11. The conveying means 12 protrudes from a slot-shaped opening 14 that twists as it extends along the guiding channel 10. FIG. 5 shows the transition from a vertical position of items 13 to a horizontal position by a twist of the rail track 10 by 90°. Establishing a desired orientation of the conveyed items in such a way is suitable for processing in devices that are arranged on different sides of the guiding channel and possibly require a specific item orientation (e.g. vertical or horizontal).

Figure 6:
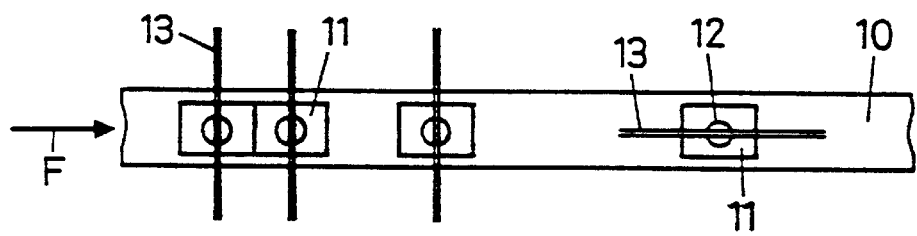

FIG. 6 shows a top view of a further rail track 10 along which conveying means 11 and holding means 12 arranged thereon are displaced. By rotating the holding means 12 relative to the conveying means 11, the flat items 13 are brought from a position perpendicular (left side of drawing) to the conveying direction to a position parallel (right side of drawing) to the conveying direction. For example, the transverse position may be established for collecting sections (little extension in rail direction and thus little space requirement) and the parallel position for processing.

Figure 7:
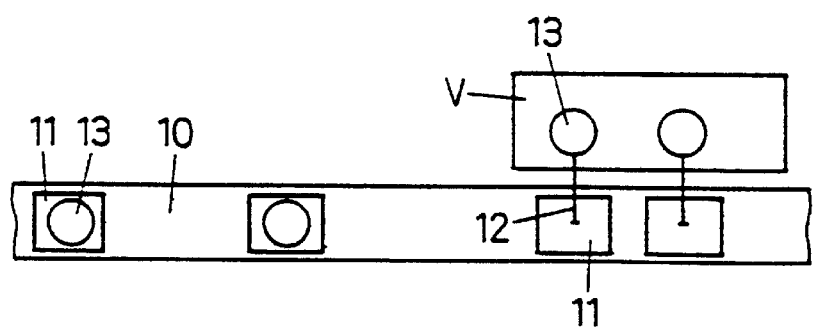

FIG. 7 shows conveying means 11 arranged in a pivoting manner on holding means 12. These allow items 13 to be brought into a position suitable for processing in processing device V.

Figure 8:
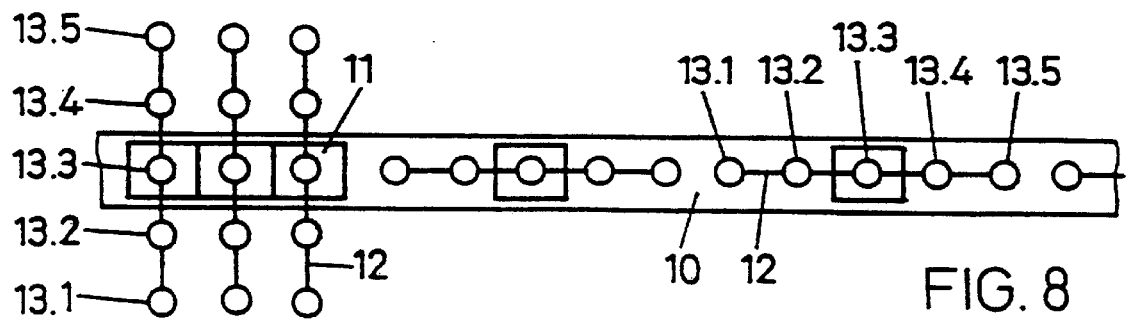

FIG. 8 shows a holding means arranged in a rotatable manner on conveying means allowing conveying items (13.1 to 13.5) according to the rotational position of the holding means arranged serially (right) or in parallel lines (left). The incompressible conveying stream shown on the left is particularly suitable for collecting sections or processing stations such as, for example, a drying oven in which the transverse position of the groups makes a high density of items possible such that parallel rail tracks, as shown in FIG. 1 for the device V.5, may not be necessary.

Changes of item orientation, as shown in examples in FIGS. 5 to 8, are carried out in particular during entry control but may also be advantageous upstream of collecting sections in order to create space saving arrangements. Track twisting (FIG. 5) and orientation changing by changing of the connections between conveying means and supporting means (rotation, pivoting, extension etc.) can also be combined in a freely selectable manner. Twisting is usually controlled purely by the rail track being twisted while changes of the connections between conveying means and holding means may be controlled by corresponding templates (rigid for unconditioned changes, movable for conditioned changes).

Orientation changes, as shown in examples in FIGS. 5 to 8, are subjected to station-internal control. Also, the speed of a cyclic movement of a template may also be controlled by the central management. Further orientation changes may be carried out by separating the holding means from the conveying means or by temporarily unloading the items from the conveying/holding means.

Figure 9:
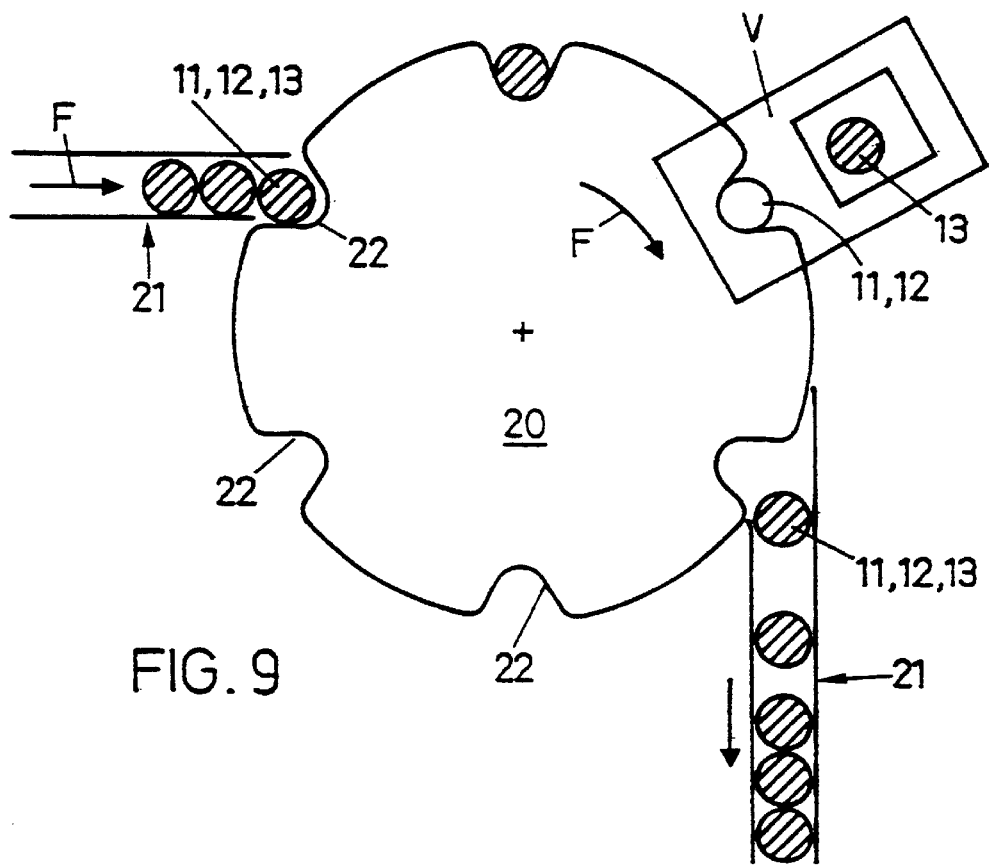
FIGS. 9 to 11 show in a schematic manner exemplified embodiments of means for creating different temporal sequences of conveying/holding means or items respectively.
Figure 10:
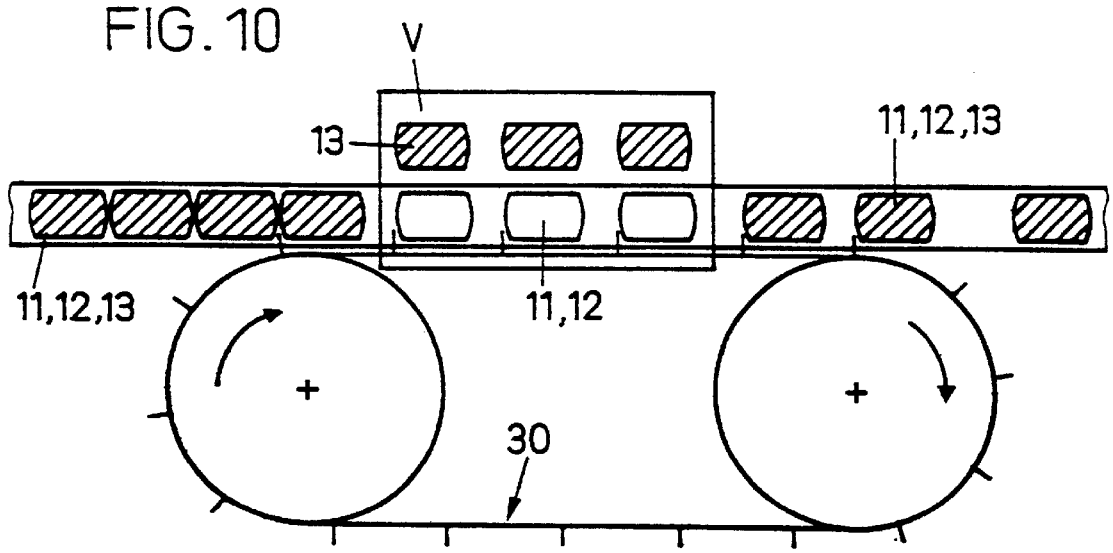
Figure 11:
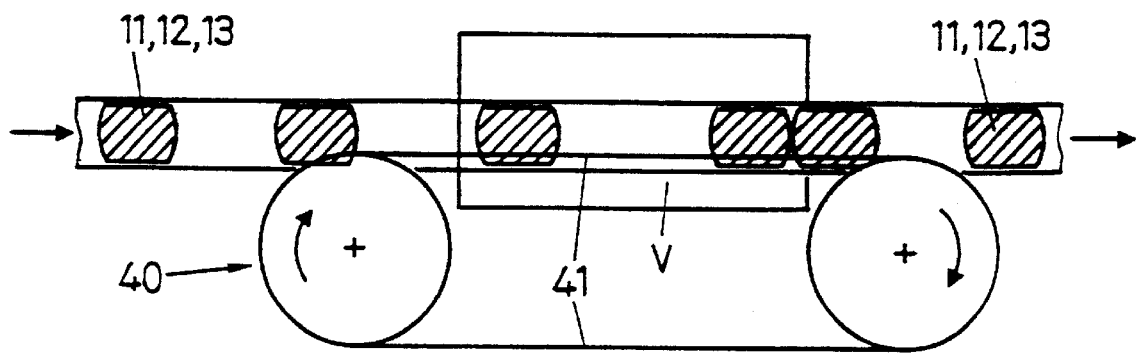

FIGS. 9 to 11 show in a schematic manner exemplified means for establishing different temporal sequences of conveying/holding means or of items respectively being applicable in loading, unloading or processing stations of an inventive processing system, in particular serving as entry control means.

FIG. 9 shows a clocking wheel 20 for removing loaded conveying/holding means 11/12/13 individually from a collecting section and conveying them into a processing device V. The clocking wheel 20 is preferably driven in a clocked manner such that rotation cycles alternate with stopping cycles. In each rotation cycle the clocking wheel 20 is rotated such that, after the cycle, the position of each conveying gap 22 corresponds to the position of the preceding conveying gap before the cycle. In each resting cycle a loaded conveying/holding means 11/12/13 from the upstream collecting section 21 is positioned in a conveying gap 22, e.g. by means of the effect of gravity, and an item 13 is processed in the processing device V, for which purpose the item 13 is brought into a processing position by changing the connection between conveying means 11 and holding means 12 (compare to FIG. 7), by separating the loaded holding means from the conveying means or by (as shown) unloading the item from the conveying/holding means 11/12 and reloading it after processing. The reloaded conveying/holding means 11/12/13 are then removed, e.g. again by means of gravity from the conveying gaps 22, and are supplied to a further collecting section 21.

By means of the clocking wheel 20 items 13 or loaded conveying/holding means 11/12/13 are arranged in a temporal sequence or conveying stream through processing device 13, which stream is synchronized with successive processing actions carried out in the processing device. Synchronization of the processing actions and clocked wheel is the task of the station-internal control in the case of a station in which the clocked wheel takes over the function of the entry control and of the conveying drive through the station. Control may also addition stop clocking wheel and processing when the collecting section upstream of the clocking wheel is empty or when the collecting section downstream is full. For required throughput variations the cycle length may be varied.

Cycle wheels of the kind shown in FIG. 9 are not only suitable for processing stations but also for loading and unloading stations.

FIG. 10 shows a further exemplified means for establishing a temporal sequence of loaded conveying/holding means 11/12/13 and for conveying conveying/holding means through a device (e.g. processing device V) or past a device. Instead of a clocking wheel, an endless chain 30 is provided. The chain conveys a continuous stream of equidistant loaded conveying/holding means 11/12/13 into the device V and out of the device. In the processing device the conveying/holding means 11/12 are, for example, unloaded and after the processing during continuous conveyance the items 13 are reloaded. It is advantageous instead of replace the loading/reloading to establish a processing position/orientation, such as described hereinbefore in connection with FIGS. 5 to 8.

For the control of the means shown in FIG. 10, the control described hereinbefore in connection with FIG. 9 is also applicable.

FIG. 11 illustrates establishing a temporal sequence of loaded conveying/holding means 11/12/13 and conveying the sequence through a processing device V. The loaded conveying/holding means 11/12/13, as soon they arrive in the region of drive 40, which is designed as an endless traction cable 41, are coupled, for example by means of pressing the traction cable 41 into a groove arranged on the conveying means. Thus, a conveying stream through the processing station is formed, which stream has a constant speed and in which the loaded conveying/holding means may have any distances from each other. The processing device V is, in this case, controlled such that a processing action is initiated when a loaded conveying/holding means 11/12/13 has reached the processing position.

In connection with FIGS. 1 to 11 different control functions of autonomous stations have been described. Further examples of this kind are:

control of the processing mode of a processing device according to item characteristics, station-internal switching off and corresponding alarm when conditions are faulty.

In order for station-internal controls to be able to function according to item characteristics, it is necessary to install sensors to sense the relevant characteristics or to have data encoding the relevant characteristics carried by, for example, the conveying/holding means in form of a bar code or an electronic data set and to install corresponding reading devices in the stations.

The above list and the preceding descriptions show that control of the autonomous stations, in the case of processing stations, largely coincide with control of corresponding processing devices that are not integrated into a system. From this it is considered clear that such stations can be integrated into the inventive system without large adaptations.

Figure 12:
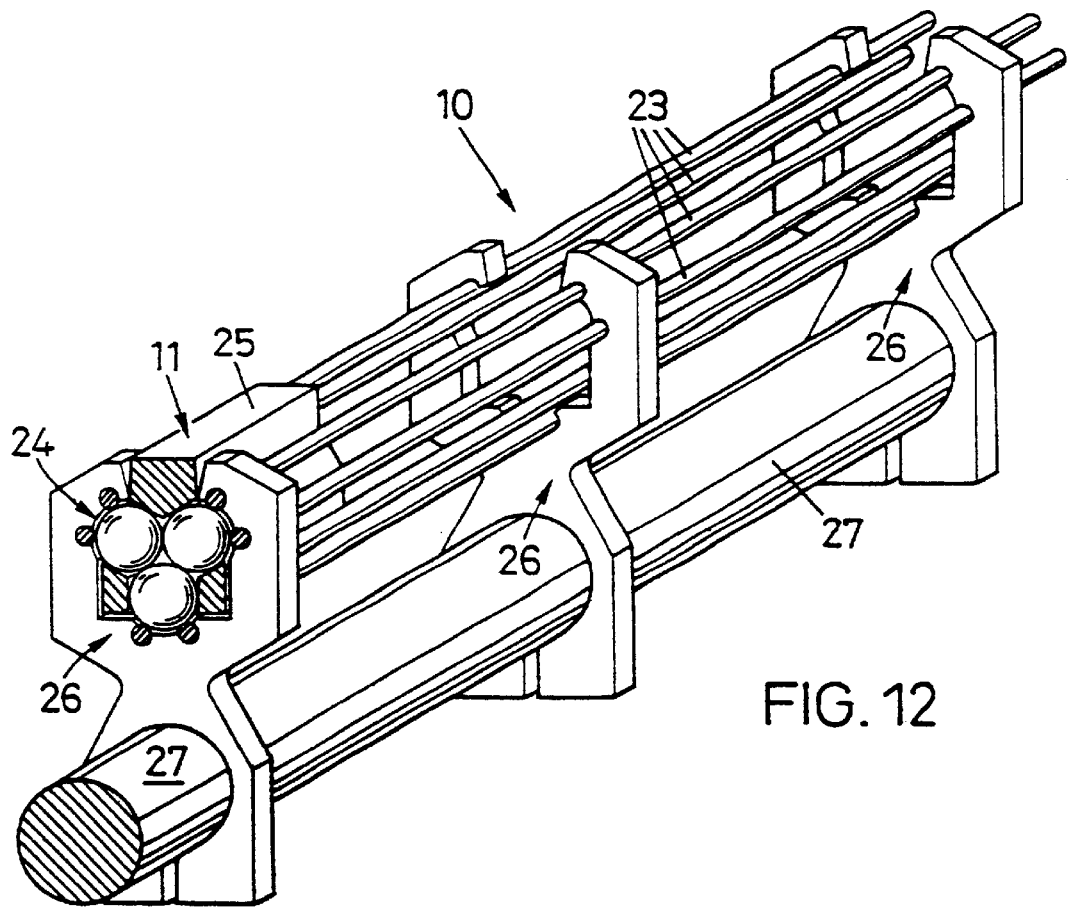
FIG. 12 shows an exemplified embodiment of rail track and conveying means displaceable along the track for application an inventive processing system.

FIG. 12 shows an exemplified embodiment of a rail track 10 and matched conveying means 11 for application in an inventive processing system. The rail track comprises six rails 23 that together form a conveying channel in which the conveying means 11 roll on groups of three balls each. The conveying means comprises a part 25 that protrudes from the conveying channel and on which a holding means (not shown) is fitted. The rails 23 consist advantageously of wires and are held in their relative position and fixed to a carrier 27 by holders 26 that are spaced from each other. The carrier 27 preferably is formed from a bendable material to allow a simple mounting of curves.

Twists in a rail track 10, as shown in FIG. 12, are very easily realizable by corresponding fixation of the holders 26 around carrier 27. Drives in the form of clocking wheels, chains and traction cables can be easily functionally coupled to the conveying means between the rails.

Mechanical units that are suited for application in the inventive system are known. The conveying system shown in FIG. 12 is, for example, described in publication EP-387318 (or U.S. Pat. No. 5,074,678) and rail tracks additionally in the applications PCT/CH97/00346 and CH-801/97. Examples for switch points applicable in the inventive system are described in the applications CH-2978/97 and CH-0065/97 (or PCT/CH97/00409) and examples of drives for the conveyance in an inventive processing system in the application CH-0341/98. Exemplified conveying/holding means with variable connections between conveying means and holding means which are correspondingly applicable for the inventive method are described in the publications DE-19645092 (or GB2-307458) or WO97/43197 or in application CH-3130/96. Conveying/holding means, the holding means of which are separable from the conveying means, and which are also applicable in the inventive system are e.g. described in the application PCT/CH97/00444.

What is claimed is:

1. Processing system for processing large numbers of substantially identical or at least similar items (13), which system comprises:

a conveying system comprising a rail system substantially closed in itself, a plurality of conveying/holding means (11/12) which can each be loaded with an item (13) or with a group of items and which are displaceable along rail tracks of the rail system independently of each other, and further comprising drive means for displacing the conveying/holding means (11/12) along the rail tracks (10) of the rail system;

at least one loading device (A) with which the conveying/holding means (11/12) are loaded in successive loading actions with an item (13) each or with a group of items each;

at least one unloading device (B) with which the conveying/holding means (11/12) are unloaded in successive unloading actions, wherein the system comprises at least one processing device (V) with which items (13) or groups of items are processed in successive processing actions, wherein the spatial orientation of the conveying/holding means (11/12) or the items (13) with which the conveying/holding means (11/12) are loaded relative to the rail tracks (10) is at least restrictedly selectable and locally variable, wherein entry control means and collecting sections for empty or loaded conveying/holding means and being arranged upstream of the entry control means are allocated to the loading, unloading and processing devices (A, B, V) the entry control means establishing a spatial orientation and a temporal sequence of the conveying/holding means (11/12) or of the items (13) or groups of items conveyed by the conveying/holding means (11/12) respectively as required by the corresponding device (A, B, V), wherein the processing system comprises a plurality of autonomous stations (S) comprising each at least one loading, unloading or processing device (A, B, V) with means for entry control allocated to it, with at least one drive for conveying of conveying/holding means through the station and with station-internal control means, and wherein at least the entry control, the conveying through the station and the function of the at least one loading, unloading or processing device (A, B, V) are matched to each other by means of the station-internal controlling means.

2. Processing system according to claim 1, further comprising at least one autonomous station (S.3, S.9, S.13, S.15) which, instead of the at least one loading, unloading or processing device (A, B, V) contains a rail bifurcation (SV) or a rail junction (SZ).

3. Processing system according to claim 1, further comprising an autonomous station (S.5, S.6, S.7, S.11) which additionally to the loading, unloading or processing device (A, B, V) contains a rail bifurcation (SV) and/or a rail junction (SZ).

4. Processing system according to claim 1, further comprising at least one autonomous station (S.16) which only comprises one drive for conveying of conveying/holding means along a rail track and control means for controlling the drive.

5. Processing system according to claim 1, wherein throughput of the autonomous stations (S) is also controlled by the station-internal controlling means according to the registered filling state of the collection section upstream of the entry control means and/or of the collection section following further downstream.

6. Processing system according to claim 1, wherein a central management means is provided which controls and matches to each other the throughputs of the autonomous stations (S) according to the system-external conditions and system-internal occurrences.

7. Processing system according to claim 6, wherein, for the central management, a central control unit (5) is provided.

8. Processing system according to claim 7, wherein, for registering system-internal occurrences for the central management unit (5), sensor means (3) for registering the filling states of at least part of the collecting section are provided.

9. Processing system according to claims 7, wherein, for registering system-external conditions for the central management unit (5), sensor means (7) are provided for registering items to be processed being available for the at least one loading device (A) and for registering processed items having been unloaded by the at least one unloading device (B) and being available for further processing.

10. Processing system according to claim 7, wherein for registering system-external requirements input means for data input into the central control unit (5) are provided.

11. Processing system according to claim 1, wherein, for establishing a spatial orientation of conveying/holding means (11/12) as required by a loading, unloading or processing station (A, B, V) or by a rail bifurcation (SV) or rail junction (SZ) a twisted rail track (10) is provided.

12. Processing system according to claim 1, wherein an orientation of a holding means (12) or item (13) or group of items required by a loading, unloading or processing device (A, B, V) or by a rail bifurcation (SV) or rail junction (SZ) is established by changing the connection between conveying means (11) and holding means (12).

13. Processing according to claim 12, wherein the connection between holding means (11) and conveying means (12) is rotatable or pivoting and/or of variable length.

14. Processing system according to claim 1, wherein as means for entry control for conveying conveying/holding means (11/12) through a loading, unloading or processing station (A, B, V) a clocking wheel (20), a chain (30) or a traction cable (41) is provided.

15. Processing system according to claim 1, wherein collecting sections are designed as conveying lines with passive conveyance.

16. Processing system according to claim 15, wherein collecting sections are designed as declining conveying lines along which conveying/holding means (11/12) are conveyed by gravity or as run-out lines on which conveying/holding means (11/12) are conveyed by kinetic energy.

17. Processing system according to claim 1, wherein the rail tracks (10) of the rail system are conveying channels with slot-shaped openings (14) extending along the channel and wherein the conveying means (11) are displaceable in the channels and the holding means (12) are connected to the conveying means such that they protrude out of the slot-shaped openings (14).

18. Processing system according to claim 17, wherein, on the inner surface of the conveying channels, six rails are arranged or wherein the conveying channels are formed by six rails and the conveying means (11) roll on groups of three balls each.

19. Processing system according to claims 1, wherein, in the processing devices (V), the items (13) or groups of items are, for processing, brought into a processing position by the holding means and are held by these in the processing position or wherein the items (13) or item groups are unloaded from the conveying/holding means (11/12) and after processing are reloaded onto the conveying/holding means.

* * * * *

UNITED STATES PATENT AND TRADEMARK OFFICE
CERTIFICATE OF CORRECTION

PATENT NO. : 6,450,319 B1
DATED : September 17, 2002
INVENTOR(S) : Reist

It is certified that error appears in the above-identified patent and that said Letters Patent is hereby corrected as shown below:

Title page,
Item [56], References Cited, U.S. PATENT DOCUMENTS, add
-- 4,881,468  11/1989  Hafner et al. --

Column 1,
Line 64, delete "and:processing" and insert -- and processing --.

Signed and Sealed this

Seventh Day of September, 2004

JON W. DUDAS
*Director of the United States Patent and Trademark Office*